(12) United States Patent  
Packham

(10) Patent No.: US 7,194,479 B1
(45) Date of Patent: Mar. 20, 2007

(54) DATA GENERATOR SYSTEM AND METHOD

(75) Inventor: Tracy Packham, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 393 days.

(21) Appl. No.: 10/754,411

(22) Filed: Jan. 9, 2004

(51) Int. Cl.
*G06F 17/00* (2006.01)
(52) U.S. Cl. .................................. 707/102; 707/104.1
(58) Field of Classification Search .................... 707/1, 707/5, 101, 102, 104.1; 703/14; 714/38, 714/41, 728; 702/186
See application file for complete search history.

(56) References Cited

U.S. PATENT DOCUMENTS

| | | | |
|---|---|---|---|
| 7,020,804 B2 * | 3/2006 | Burdick et al. ............... | 714/41 |
| 2004/0230881 A1 * | 11/2004 | Gwak ......................... | 714/728 |

OTHER PUBLICATIONS

Gwak et al., An Auto-Generating Tool for the MPEG-2 formatted Test data: ATEP, 2001 IEEE, pp. 192-199.*
Seo et al., Tailoring Test Process by using the Component-Based Development Paradigm and the XML Technology, 2000 IEEE, pp. 356-363.*
Yoon et al., An Effective Testing Technique for Component Composition in EJBs, 2001 IEEE, pp. 229-236.*

* cited by examiner

*Primary Examiner*—Apu M. Mofiz

(57) ABSTRACT

A method for generating data is provided. The method includes providing a first file having at least one format definition including a plurality of field identifiers and a data value associated with at least one the field identifiers, the first file maintaining an identifier of at least a second file. The method includes selectively managing the second file based on an instruction, and generating to the second file a data string according to the format definition, the data string including the data value of the at least one field identifier. A system and method for generating data for test applications is also provided.

20 Claims, 1 Drawing Sheet

DATA GENERATOR SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention is directed to computer software, and more particularly, but not by way of limitation, to a system and method for generating data files.

BACKGROUND OF THE INVENTION

A typical approach to testing computer programs or applications is to input test data to the application, capture the response of the application to this input, and determine if the response is correct given the known input. For applications which receive very large or complex inputs, producing the input needed to test the application may be difficult and costly.

Applications may be designed to be chained together, with the output of one application directed to the input of another application. In a test environment, the upstream application may be configured to direct its output into a test data file, and this test data file may be employed to provide input to the downstream application under test. In some circumstances existing data files may be edited to produce the needed test data file. In other cases a data file may be manually created from scratch and thereafter edited to produce different test data files.

SUMMARY OF THE INVENTION

A method for generating data is provided. The method includes providing a first file having at least one format definition including a plurality of field identifiers and a data value associated with at least one the field identifiers, the first file maintaining an identifier of at least a second file. The method includes selectively managing the second file based on an instruction, and generating to the second file a data string according to the format definition, the data string including the data value of the at least one field identifier.

In one embodiment a system for providing data for test applications is provided. The system comprises a storage component operable to maintain a first file having a format definition including a field identifier, and a data value associated with the field identifier. The system includes a processing component programmed to read the first file and associate the data value with the field identifier, the processor component further operable, based on an instruction, to write the data value of the field identifier to a second file based on the format definition.

In one embodiment a method of generating test data for use to test an application is provided. The method comprises identifying a data field and a data value for the data field to test an application, providing a data definition including the data field in a property file, the property file having an instruction, providing the data value of the data field to the property file, and providing the data field and data value to a test file using the property file and based on the instruction, the test file used to test the application.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

In order to test an application, an upstream application which supplies input to the application may be configured to direct its output into a test data file. This test data file may then be employed as input to the application under test. This method of obtaining test data input has some drawbacks. The team which controls the upstream application may not be able generate the needed test data file in a timely manner. Additionally, the upstream application may not be capable of generating the needed test data file if the upstream application is being designed or modified concurrently with the downstream application.

In a test environment, data files may be manually edited to produce test data input files. Some data output produced by COBOL applications, formatted according to COBOL copybook definitions, for example, may comprise a 5000 character long data string or data record where the different data fields are not delimited by any special character. A COBOL copybook is a definition of a data format or a structure of data wherein the data is a composite of heterogeneous data fields. To edit a data field in a data string formatted according to one of these COBOL copybook definitions comprising a several thousand character long data string, for example, an order number comprising 10 characters beginning at character 2749 in the data string, may be difficult, time consuming, and subject to error. Worse, an error introduced in generating the test data file may not be discovered until after the test is run, after a trouble report is generated, and after a software developer invests time and effort to identify the source of the error. In this case, the testing process is delayed, and the software developer is pulled away from more productive activities.

Figure 1:
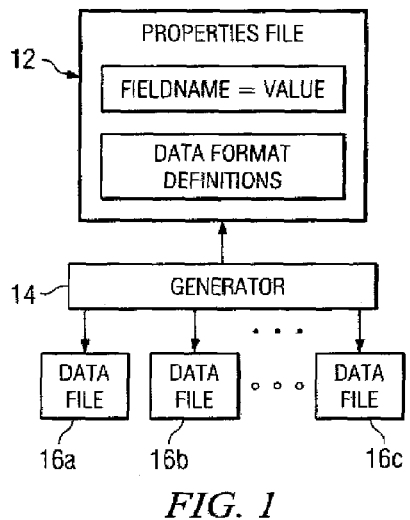
FIG. 1 depicts a block diagram, according to one embodiment, of the functional components of the data generator system.

Turning now to FIG. 1 a system 10 for data generation is depicted. The system 10 provides a simple, easy, accurate way of creating and editing data files for use by software applications or computer programs under test. A properties file 12 is read by a generator 14 which processes the contents of the properties file 12 to generate one or more data files 16, which are designated alphanumerically 16a, b, and c for reasons which will be discussed below.

Although FIG. 1 depicts the preferred embodiment in which the generated data is written to one or more files 16, in other embodiments the generated data may flow directly to an application accepting the data as input. Additionally, although in the preferred embodiment the generator 14 accesses the properties file 12 by reading the properties file, in other embodiments the contents of the properties file 12 may be accessed by the generator 14 by some other means than reading from a file. For example, in another embodiment the contents of the properties file 12 may be streamed from some other application to the generator 14 through interprocess communication, through a socket connection between the other application and the generator 14, or through some other means. All of these alternatives are contemplated by the present disclosure.

The system 10 for data generation may execute on a general purpose computer system, which will be discussed in more detail hereinafter. The various components of the system 10 for data generation may exist on the same computer or they may exist in various combinations on separate computers. The generator 14 may be constructed to execute as a distributed application, where subcomponents of the generator 14 execute on different computers and intercommunicate to cooperatively complete the functions of the generator 14. The properties file 12 and the data files 16 may be stored on different computers or on different database systems.

Data in the data file 16 may be structured as a data string or data record. Multiple data files 16a, 16b, and 16c are generated by the system 10 for data generation when multiple different data string formats are needed. For example, a data string describing a telephone circuit may be formatted according to a first data string format and be stored in the data file 16a, a data string describing a header may be formatted according to a second data string format and be stored in the data file 16b, and a data string describing a trailer may be formatted according to a third data string format and be stored in the data file 16c. Each data file 16a, 16b, and 16c is associated with a unique data string format. Each data file 16a, 16b, and 16c contains a single data string.

The data string formats are comprised of data fields associated with specific information. For example, a data string format for employee information may comprise data fields including a first name field, a last name field, a middle initial field, a home phone number field, and a date of birth field. In the preferred embodiment a fixed length data string is employed and hence data fields have specific sizes. In other embodiments, data fields within the data string may be delimited by special characters, such as commas, and data fields may be of indefinite length.

The properties file 12 defines data field values, defines data string formats, and identifies one or more data strings to generate. In one embodiment the properties file 12 comprises definitions of values for field identifiers or data field names, definitions of data string formats as a concatenation of the field identifiers or data field names, and a catalog of data strings to generate. For example, a properties file 12 may contain the following entries. This is a rudimentary example.

values defined for field identifiers or data field names: value definition portion of file
    PON=PON598
    TOSYSID=FGRCIRAS
    FROMSYSID=TMACIRAS
    FROM-TERMID=GHRCIRAS
    ASRSENTTIME=2002010103030401
    CCNA=CCNC
definition of data string formats: data string format portion of file
    HEADER=TOSYSID,FROMSYSID,FROM-TERMID, PON,CCNA
    CIRCUIT=TO_SYSID,FROMSYSID,FROM-TERMID, ASRSENTTIME
    TRAILER=PON,CCNA,TOSYSID,FROMSYSID, FROM-TERMID,TO-OTC-ID
catalog of data strings to generate: control section of file
for 1 circuit use
    COPYBOOKNAME=HEADER,CIRCUIT,TRAILER
for 2 circuits use
    COPYBOOKNAME=HEADER,CIRCUIT The definition of the data string format within the properties file 12 may also include definitions of the position of the data fields within the data string and definitions of the length of the data fields. The line PON=PON598 is an example of a field identifier being associated with a value. The left hand text "PON" is the field identifier, and the right hand text "PON598" is the value associated with the PON field identifier. The field identifiers name a data field. These data field names, or field identifiers, are also used in the definition of the data string format. The identification of one or more data strings to generate may be viewed as an instruction to the generator 14. While the preferred embodiment employs command line arguments to indicate whether a completely new data file 16 is to be generated or whether a change to an existing data file 16 is to be made, in some embodiments a "change" or "new" instruction or flag may be located in the properties file 12.

The generator 14 writes the data field values that the generator 14 reads from the properties file 12 into the data file 16 in position and according to the format defined by the data string formats the generator 14 reads from the properties file 12. For every data string that the properties file 12 identifies to be generated, the generator 14 writes to a different data file 16, for example, data files 16a, 16b, through 16c. The data file 16 corresponding to the HEADER data format and using the values specified in the example properties file content above would contain the data string
    FGRCIRASTMACIRASGHRCIRASPON598CCNC The generator 14 in the present embodiment is a computer program or application. The generator 14 reads the input properties file 12 and produces as output the data file 16 (or data files 16a, 16b, through 16c). In some embodiments, a command script may be employed to first define the execution environment variables and to then invoke the generator 14. For example, if the generator 14 is implemented in the Java programming language, the command script might define the Java classpath environment variable so the Java virtual machine will know where to find the Java class definitions which comprise the generator 14 application.

In some environments, data files 16 need to be generated with minor differences. In this case, the generator 14 may be invoked by the user specifying that changed data files 16 should be produced rather than new data files 16. In some embodiments the command line entry to cause the generator 14 to produce changed data files 16 is "run change" and the command line entry to cause the generator 14 to produce new data files 16 is "generate new."

When producing changed data files 16, rather than generating new data files 16, a partial properties file 12 is employed that defines all the data string formats and defines values only for those data fields in the data string which need to change. The partial properties file 12 is produced from an empty properties file 12, for example a properties file 12 containing definitions of all data string formats and identification of data strings to be produced but containing no definition of data field values, by editing the empty properties file 12 to add the specific values which need to be changed.

In another execution mode, an empty properties file 12 may be established and the generator 14 may be invoked at the command line with the argument 'change' and with additional arguments specifying data field names and values to be given to those data fields. In this case the generator 14 would build a new data file 16 (or data files 16a, 16b, through 16c) containing the data field values of the old data file 16, and only the values of the data fields explicitly provided as arguments to the command line would be changed. Typically, the entry of data field names and values on the command line is only used when very few data fields need to be changed, since entry of many data fields and their values on the command line becomes awkward.

When the properties file 12 identifies multiple data strings to generate, for example HEADER, CIRCUIT, and TRAILER as in the example properties file 12 above, the generator 14 writes data strings out to multiple different files 16a, 16b, and 16c, each file containing one data string corresponding to one data string format definition. The tester may build a subset of data files 16 by modifying the properties file 12 to identify those data strings the tester wishes to generate. For example, the tester may modify the line in the properties file 12 which reads COPYBOOKNAME=HEADER, CIRCUIT,TRAILER to read COPYBOOKNAME=HEADER,TRAILER. In this case, the generator 14 will build two data files 16, one data file containing a data string formatted according to the HEADER data string format and one data file containing a data string formatted according to the TRAILER data string format.

When the upstream application changes the data string format that it employs to generate output, the corresponding definition of the data string format in the properties file 12 should be updated with a new definition of the data string format. It is generally easier to modify the properties file 12 to accommodate data string format changes than it would have been to hard-code the data string format definitions in the generator 14 and then recode and redeploy the generator 14 application every time the data string format is modified. This ease of modification provided by the employment of the properties file 12 is one benefit of the system 10 for data generation.

A COBOL application may use a copybook source file to define the layout or structure of the data it outputs to a downstream application. The copybook source file is specified in a copy directive within the LINKAGE SECTION of the CICS source program or the WORKING-STORAGE SECTION of an IMS source program. An example of a copybook layout is:

```
01  B-ACCEPTANCE-RECORD.
    05  B-STD-CTL.
        10  B-TO-SYSID          PIC X(8)
        10  B-FROM-SYSID        PIC X(8)
        10  B-FROM-TERMID       PIC X(8)
        10  B-STD-SENT-DATE-TIME.
            15  B-STD-SENT-DATE.
                20  B-SENT-CC   PIC XX.
                20  B-SENT-YY   PIC XX.
                20  B-SENT-MM   PIC XX.
                20  B-SENT-DD   PIC XX.
```

Data which adheres to this format may look like this:

| TOSYSIS | FSYSI | FTERM | 20030215 |
|---------|-------|-------|----------|

The above example represents a somewhat short copybook, being only 32 bytes long. While it would not be difficult to text edit this data string to modify the value of day sent, the B-SENT-DD field, it would be much more difficult and error prone if this data were located at byte 3727 in a 5000 byte long data string.

In the preferred embodiment, the system 10 for data file generation is employed to generate the data file 16 so that it contains a single data string according to a data format corresponding to the COBOL copybook that the upstream COBOL application has employed to define the format of its data output. This data format is defined in the properties file 12, as discussed above. The data string produced by the system 10 for data file generation is structurally equivalent to the data that would be output by the COBOL application. Note that the properties file 12 does not contain a COBOL copybook definition like that illustrated above. The properties file 12 contains a definition of the data string format which results in a structurally equivalent data string, but the syntax of the data string format in the properties file 12 does not adhere to COBOL copybook syntax. The properties file 12 data string format definition includes listing all data fields comprising a data string format, an indication of position of the data field within the data string, and the size of the data field.

Figure 2:
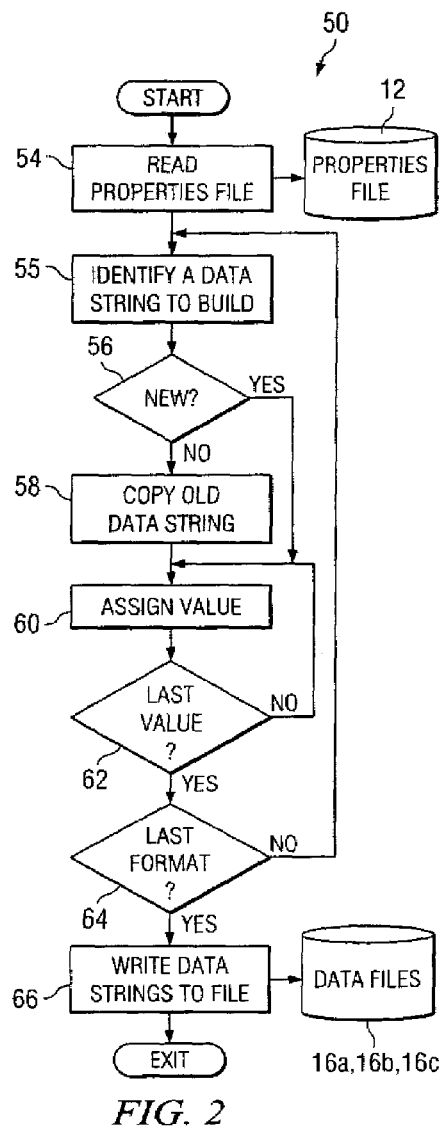
FIG. 2 depicts a flow chart diagram, according to one embodiment, of the generation of data.
Figure 3:
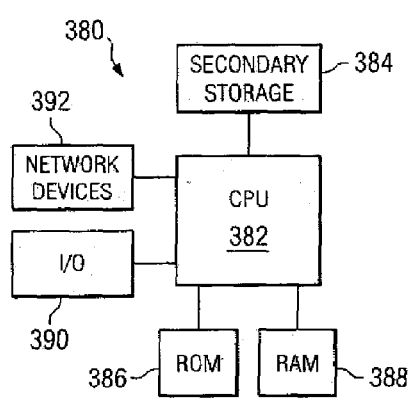
FIG. 3 illustrates an exemplary general purpose computer system suitable for implementing the several embodiments of the data generator system.

Turning now to FIG. 2 a flow chart 50 depicts an exemplary functional flow for the generator 14. Note that this flow diagram depicts only one example of how the generator 14 may function. The process begins at block 54 in which the properties file 12 is read. The process proceeds to block 55 where a data string to be built is identified. Recall that the properties file 12 identifies one or more data strings to be generated. Block 55 involves selecting one of these data strings to be generated in accordance with the associated data string format. The process proceeds to block 56.

At block 56, if the generator 14 was invoked with a "change" argument, the process proceeds to block 58 where the data string of one data file 16a, 16b, or 16c is copied. At block 56, if the generator 14 was invoked at the command line, for example, without an argument, a completely new generation of the data files 16 will be created, and the process proceeds directly to block 60

At block 60, one of the data fields of the data string format associated with the data string selected for building in block 55 is assigned the value defined for that data field in the properties file 12. If the generator 14 was invoked with the "new" command line argument, and if some field identifiers or data field names defined for the data string format are not provided values in the properties file 12, these data fields are assigned a null value in the data string. A null value may be the number 0 for numeric type data, may be the NULL character for character data, may be a sequence of NULL characters for a character string, or may be some other default value. If the generator 14 was invoked with the "change" command line argument and provided additional arguments stipulating data field names and values to be given to those data fields, the data field is assigned the value from the command line rather than from the properties file 12. This value assignment overwrites the corresponding data field in the copied old data string, leaving the other data fields in the copied old data string unchanged, if processing passed through block 58.

Processing proceeds to block 62 in which a decision is made. If the data field which was assigned a value in block 60 is not the last of the data fields defined for the data string format associated with the data string selected for building in block 55, the process proceeds back to block 60. The process 50 loops between block 60 and block 62, assigning each of the data fields defined for the data string format associated with the data string selected for building in block 55, until all the data fields are assigned values. After all the data fields defined for the data string format associated with the data string selected for building in block 55, the process proceeds to block 64.

At block 64, if all of the data strings identified by the properties file 12 have not been built, the process returns to block 55 in which a different data string is selected to be build, and the data fields defined in the data string format associated with that data string are assigned values by passing through the blocks 60 and 62. The process flow loops between block 55 and block 64, building each of the data strings identified in the properties file 12 in turn.

At block 64, if the last of the data strings defined in the properties file 12 has been built, the process proceeds to block 66 where the data strings built in the above processing are written out to the data files 16a, 16b, and 16c. In some embodiments, writing the data strings out to the data files 16 may be accomplished when the data string associated with a data string format is completely built and before selecting a different data string format to be built. In this case, the processing accomplished at block 66 could be relocated between processing blocks 62 and 64.

The flow chart 50 is illustrative, and the present disclosure is not limited to the disclosed processing blocks or the order of processing blocks described above.

If a different data file 16 or set of data files 16 is needed, the user simply edits the properties file to change the values of the specific fields which need to be changed and then re-executes the generator 14.

The system 10 for data generation described above may be implemented on any general-purpose computer with sufficient processing power, memory resources, and networking capability. FIG. 9 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device where, for example, RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, keyboards, mice, track balls, voice recognizers, card readers, paper tape readers, or other well-known input devices. The network connectivity devices 392 may take the form of modems, modem banks, ethernet cards, token ring cards, fiber distributed data interface (FDDI) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

The system 10 for data file generation may substantially decrease both the time consumed in creating data needed to test software and reduce the errors produced in the data that would otherwise be created manually, and enables software developers to support their own testing activities.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discreet or separate may be combined or integrated with other systems, modules, techniques, or methods without departing from the scope of the present disclosure. Other items shown as directly coupled or communicating with each other may be coupled through some interface or device, such that the items may no longer be considered directly coupled to each but may still be indirectly coupled and in communication with one another. Other examples of changes, substitutions, and alterations are ascertainable by one skilled in the art and could be made without departing from the spirit and scope disclosed herein.

What is claimed is:

1. A method of generating test data to test an application, the method comprising:
   defining in a property file a set of data field identifiers with a data value corresponding to each of the data field identifiers;
   defining in the property file at least one test string format as a sequence of a subset of the data field identifiers in the property file,
   wherein the definitions in the property file do not adhere to a COBOL copybook syntax;
   providing a command prompt instruction for generating a test file;
   generating a string of test data the data to the test file based on the instruction, wherein the string of test data is structurally equivalent to a data string output by a COBOL application and includes a sequence of the data values that are not delimited by any special character and arranged in accordance with the sequence of corresponding field identifiers defined by one of the test string formats in the property file;
   testing the application with the test file; and
   modifying the contents of the test file with a change test file command prompt instruction.

2. The method of claim 1, further comprising:
   defining in the property file an indication of which of the at least one test string formats are to be used to generate test files.

3. The method of claim 2, wherein a separate test file is generated for each of the test string formats in the indication.

4. The method of claim 1, further comprising:
   defining in the property file a second set of data field identifiers without a corresponding data value, wherein the test string format is defined in the property file to also include a subset of the second set of data field identifiers in the sequence.

5. The method of claim 4, wherein a null value is generated in the string of test data for each data field identifier that belongs to the second set of field identifiers.

6. The method of claim 4, wherein the command prompt instruction includes an argument defining a data value for at least one data field identifier that belongs to the second set of field identifiers to be used in the string of test data.

7. The method of claim 1, wherein the command prompt instruction includes an argument defining a data value for at least one data field identifier to be used in the string of test data instead of the data value defined in the property file.

8. The method of claim 1, wherein each field identifier is a COBOL data definition.

9. The method of claim 1, further comprising:
   editing at least one data value in the property file; and
   generating a new string of test data in accordance with the edited property file.

10. The method of claim 9, wherein the new string of test data is generated to overwrite the test file.

11. The method of claim 9, wherein the new string of test data is generated to a new test file.

12. A method of generating test data to test an application, the method comprising:
   defining in a property file a plurality of data field identifiers with a data value corresponding to at least one of the data field identifiers, and at least one test string format as a sequence of the data field identifiers, wherein the definitions in the property file do not adhere to a COBOL copybook syntax;
   generating a first test file corresponding to the test string format based on a new test file command prompt instruction, wherein the first test file is created to include a string of the data values that is structurally equivalent to a data string output by a COBOL application and the data values are not delimited by any special character and are arranged in accordance with the sequence of corresponding field identifiers in one of the test string formats;
   testing the application with the test file; and
   modifying the contents of the first test file with a change test file command prompt instruction.

13. The method of claim 12, wherein a null value is generated in the string of test data for each data field identifier that does not have a corresponding data value.

14. The method of claim 12, wherein the new test file command prompt instruction includes an argument defining a data value for at least one data field identifier to be used in the string of test data instead of the data value defined in the property file.

15. The method of claim 12, wherein the change test file command prompt instruction includes an argument defining a new data value for at least one data field identifier, wherein each of the data values in the string corresponding to the data field identifier in the argument are overwritten in the first test file with the new data value.

16. The method of claim 15, wherein the data values in the string not corresponding to the data field identifier in the arguments are unchanged in the first test file.

17. The method of claim 12, further comprising:
   producing an empty property file that includes the data field identifiers and the at least one test string format in the property file; and
   editing the empty property file to associate a data value with each data field identifier that is to be changed in the first test file, wherein the contents of the first test file are modified by each of the data values in the string corresponding to the data field identifiers that have an associated data value in the edited property file being overwritten in the first test file with the corresponding data value in the edited property file.

18. The method of claim 12, further comprising:
   producing an empty property file that includes the data field identifiers and the at least one test string format in the property file, wherein the change test file command prompt instruction includes arguments defining new data values for each data field identifier that is to be changed, wherein each of the data values in the string corresponding to the data field identifiers in the argument are overwritten in the first test file with the corresponding new data value.

19. The method of claim 18, wherein only data values in the string in the first file corresponding to data field identifiers in the arguments are overwritten.

20. The method of claim 12, further comprising:
   editing at least one test string format in the property file.

* * * * *